(12) United States Patent
Sharma et al.

(10) Patent No.: US 11,161,075 B2
(45) Date of Patent: Nov. 2, 2021

(54) SYSTEM AND METHOD FOR OPTIMIZED OPERATION OF FLUE GAS DESULFURIZATION UNIT

(71) Applicant: General Electric Company, Schenectady, NY (US)

(72) Inventors: Rachit Sharma, Bangalore (IN); Chayan Mitra, Bangalore (IN); Jayeshkumar Jayanarayan Barve, Bangalore (IN); Venkatarao Ryali, Bangalore (IN); Frank Klaus Ennenbach, Stuttgart (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/760,093

(22) PCT Filed: Aug. 29, 2018

(86) PCT No.: PCT/US2018/048463
§ 371 (c)(1),
(2) Date: Apr. 29, 2020

(87) PCT Pub. No.: WO2019/055211
PCT Pub. Date: Mar. 21, 2019

(65) Prior Publication Data
US 2021/0086130 A1    Mar. 25, 2021

(30) Foreign Application Priority Data

Sep. 12, 2017 (IN) .............................. 201741032252

(51) Int. Cl.
| | |
|---|---|
| *B01D 53/34* | (2006.01) |
| *B01D 53/50* | (2006.01) |
| *B01D 53/80* | (2006.01) |

(52) U.S. Cl.
CPC ......... *B01D 53/346* (2013.01); *B01D 53/504* (2013.01); *B01D 53/80* (2013.01);
(Continued)

(58) Field of Classification Search
CPC ................ B01J 19/0006; B01J 19/0033; B01J 2219/00049; B01J 2219/00182;
(Continued)

(56) References Cited

U.S. PATENT DOCUMENTS

| | | | | |
|---|---|---|---|---|
| 5,788,944 A | * | 8/1998 | Kikkawa ................ | B01D 53/30 423/243.01 |
| 7,862,771 B2 | * | 1/2011 | Boyden ................ | G05B 13/027 422/62 |

(Continued)

FOREIGN PATENT DOCUMENTS

| | | |
|---|---|---|
| CN | 103111183 A | 5/2013 |
| CN | 103513006 A | 1/2014 |

(Continued)

OTHER PUBLICATIONS

Internatonal Search Report for corresponding PCT Application No. PCT/US2018/048463 dated Dec. 18, 2018, 3 pages.

(Continued)

*Primary Examiner* — Timothy C Vanoy
(74) *Attorney, Agent, or Firm* — Hoffman Warnick LLC (57) ABSTRACT

A method (200) for desulfurization of a flue gas in a desulfurization unit of an industrial plant, includes receiving (202) a plurality of baseline parameters corresponding to the desulfurization unit of the industrial plant. The method further includes measuring (204), using a stack sensor, an emission value of sulfur oxides in the flue gas. The method also includes estimating (208), using a controller, a desirable value of a slurry parameter for desulfurization of the flue gas based on the measured emission value of the sulfur oxides.

(Continued)

The method further includes determining (208), using the controller, at least one desulfurization parameter based on the desirable value of the slurry parameter. The method also includes controlling (210), using the controller, operation of the desulfurization unit based on the at least one desulfurization parameter to modify consumption of at least one of a slurry and an auxiliary power in the industrial plant.

19 Claims, 3 Drawing Sheets

(52) U.S. Cl.
CPC .. *B01D 2251/404* (2013.01); *B01D 2251/606* (2013.01); *B01D 2257/302* (2013.01)

(58) Field of Classification Search
CPC .. B01J 2219/00186; G05B 6/00; G05B 13/00; G05B 21/00; G05D 21/00; B01D 53/50; B01D 53/504; B01D 53/79; B01D 2257/302; B01D 2258/0283
See application file for complete search history.

(56) References Cited

U.S. PATENT DOCUMENTS

| | | | |
|---|---|---|---|
| 9,675,932 B2 * | 6/2017 | Naito | B01D 53/002 |
| 2013/0036953 A1 | 2/2013 | Mitsui et al. | |
| 2013/0149206 A1 | 6/2013 | Ukai et al. | |
| 2014/0308191 A1 | 10/2014 | Mazyck et al. | |
| 2017/0050144 A1 | 2/2017 | Kamiyama et al. | |

FOREIGN PATENT DOCUMENTS

| | | |
|---|---|---|
| CN | 204134471 U | 2/2015 |
| JP | 3864566 B2 | 1/2007 |
| WO | 2016074190 A1 | 5/2016 |

OTHER PUBLICATIONS

Brown et al., "Optimization of $SO_2$ Scrubber using CFD Modeling," Science Direct, Procedia Engineering 83 (2014), 170-180.

* cited by examiner

SYSTEM AND METHOD FOR OPTIMIZED OPERATION OF FLUE GAS DESULFURIZATION UNIT

BACKGROUND

Embodiments of the present specification relate generally to desulfurization of flue gas, and more particularly to systems and methods for optimal operation of a flue gas desulfurization unit of an industrial plant.

In an industrial plant, such as a coal power plant, steam is generated for driving a generator using the heat energy produced by coal combustion. Coal combustion generates flue gas having oxides of nitrogen (NOx), oxides of sulfur (SOx), and particulate matter. Industrial regulations provide regulatory bounds on the quantity of oxides of nitrogen and oxides of sulfur released to the environment through an exhaust of the coal power plant. Typically, a Selective Catalytic Reactor (SCR) is used to control the oxides of nitrogen and an Electrostatic Precipitator (ESP) is used to reduce the particulate matter in the exhaust. The oxides of sulfur (SOx) in the exhaust are processed by a Flue Gas Desulfurization (FGD) unit before being released into the environment through the exhaust. Also, regulatory bounds for oxides of sulfur are region specific and are specified by respective governments. For example, while the flue gas from the boiler of the coal power plant may contain 2000 parts per million (ppm) SOx, legal requirements specified by the regulatory body may specify an upper limit of 200 ppm of SOx in the exhaust.

Processing of SOx via use of the FGD unit entails use of slurry such as lime and other alkalis including sorbent solutions containing sodium compounds such as sodium bicarbonate. The slurry reacts with the SOx in the flue gas resulting in unreacted slurry and fly ash. A particulate removal device located upstream of a reaction chamber of the FGD unit is typically used to remove entrained particulates. Currently, a large quantity of slurry is pumped into the reaction chamber of the FGD unit. For example, in the presently available coal power plants, hundreds of liters of slurry are pumped every minute to the reaction chamber that is typically located at a height of few hundred feet. Also, a portion of power (auxiliary power) generated by the industrial plant is used for pumping the slurry to the reaction chamber of the FGD unit. Moreover, in the presently available industrial plants, an additional amount of slurry is used to react with the flue gas to ensure legal/regulatory compliance.

BRIEF DESCRIPTION

In accordance with one aspect of the present specification, a method for desulfurization of a flue gas in a desulfurization unit of an industrial plant is presented. The method includes receiving a plurality of baseline parameters corresponding to the desulfurization unit of the industrial plant. The method further includes measuring, using a stack sensor, an emission value of sulfur oxides in the flue gas. Further, the method includes estimating, using a controller, a desirable value of a slurry parameter for desulfurization of the flue gas based on the measured emission value of the sulfur oxides. Moreover, method includes determining, using the controller, at least one desulfurization parameter based on the desirable value of the slurry parameter. The method also includes controlling, using the controller, operation of the desulfurization unit based on the at least one desulfurization parameter to modify consumption of at least one of a slurry and an auxiliary power in the industrial plant.

In accordance with another aspect of the present specification, a desulfurization unit in an industrial plant is presented. The desulfurization unit includes a reactor chamber and a plurality of slurry injectors coupled to the reactor chamber. The desulfurization unit further includes a plurality of slurry pumping motors operatively coupled to the plurality of slurry injectors. The plurality of slurry pumping motors includes at least one variable frequency drive motor. The desulfurization unit further includes a stack sensor disposed in the reactor chamber and configured to measure an emission value of a flue gas. The emission value is representative of sulfur oxides in the flue gas. The desulfurization unit also includes a controller unit communicatively coupled to the stack sensor and the at least one variable frequency drive motor. The controller unit includes a signal acquisition subunit communicatively coupled to the stack sensor and configured to receive a plurality of baseline parameters corresponding to the desulfurization unit of the industrial plant. The controller unit further includes a controller communicatively coupled to the signal acquisition subunit and configured to estimate a desirable value of a slurry parameter for desulfurization of the flue gas based on the measured emission value. The controller is further configured to determine at least one desulfurization parameter based on the desirable value of the slurry parameter. The controller is also configured to control operation of the desulfurization unit based on the at least one desulfurization parameter to modify consumption of at least one of the slurry parameter and auxiliary power in the industrial plant.

In accordance with yet another aspect of the present specification, an industrial plant is presented. The industrial plant includes a boiler including a combustion chamber and configured to receive coal from a coal inlet and condensed steam from a steam condensation unit. The boiler is further configured to facilitate combustion of the coal to generate steam for power generation. The combustion of the coal also generates flue gas having sulfur oxides. The industrial plant further includes a desulfurization unit, which in turn includes a reactor chamber and a plurality of slurry injectors coupled to the reactor chamber via a plurality of bypass valves. The plurality of slurry injectors is disposed at different levels along a length of the reactor chamber. The desulfurization unit further includes a plurality of slurry pumping motors operatively coupled to the plurality of slurry injectors. The plurality of slurry pumping motors includes at least one variable frequency drive motor. The desulfurization unit further includes a stack sensor disposed in the reactor chamber and configured to measure an emission value of a flue gas. The emission value is representative of sulfur oxides in the flue gas. The desulfurization unit also includes a controller unit communicatively coupled to the stack sensor and the at least one variable frequency drive motor. The controller unit includes a signal acquisition subunit communicatively coupled to the stack sensor and configured to receive a plurality of baseline parameters corresponding to the desulfurization unit of the industrial plant. The controller unit further includes a controller communicatively coupled to the signal acquisition subunit and configured to estimate a desirable value of a slurry parameter for desulfurization of the flue gas based on the measured emission value. The controller is further configured to determine at least one desulfurization parameter based on the desirable value of the slurry parameter. The controller is also configured to control operation of the desulfurization unit based on the at least one desulfurization parameter to modify consumption of at least one of the slurry parameter and auxiliary power in the industrial plant.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, systems and methods for improved operation of a flue gas desulfurization unit of an industrial plant are presented. More particularly, the systems and methods are configured for controlling the operation of the desulfurization unit to enable reduction of consumption of slurry and utilization of auxiliary power in the industrial plant.

Figure 1:
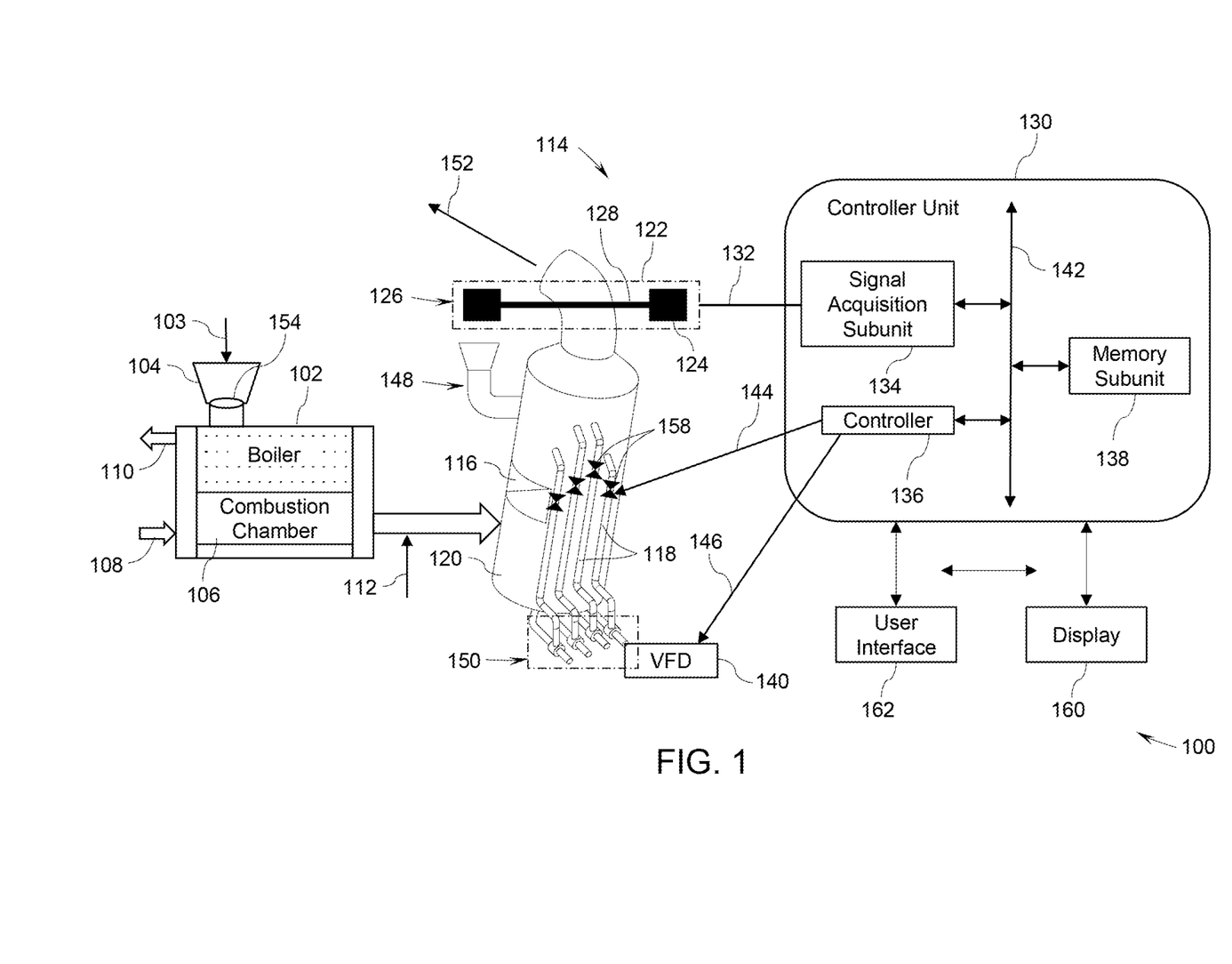
FIG. 1 is a diagrammatic illustration of an industrial plant having a flue gas desulfurization unit for optimized flue gas desulfurization, in accordance with aspects of the present specification.

FIG. 1 is a diagrammatic illustration of an industrial plant 100 having a flue gas desulfurization (FGD) unit 114 designed for improved flue gas desulfurization, in accordance with aspects of the present specification. Although a coal power plant is considered in the illustrated embodiment, the industrial plant 100 may include other types of power plants employing industrial processes generating emissions from combustion of fuels such as, but not limited to, oil, pet-coke and biomass. In one embodiment, the industrial plant 100 includes a boiler 102 having a coal combustion chamber 106 and configured to provide steam to a power generator (not shown in FIG. 1). The boiler 102 has a coal inlet 104 for receiving fuel such as coal and a condensed steam inlet 108 for receiving condensed steam from a condenser of the power generator. The combustion chamber 106 aids in the combustion of coal to provide heat energy to facilitate generation of steam 110 from the boiler 102.

As will be appreciated, the coal combustion in the combustion chamber 106 also results in the generation of flue gas 112 having sulfur oxides. It is desirable to reduce levels of sulfur oxides in the flue gas 112 to comply with legal and regulatory bounds on the sulfur oxide content in the flue gas 112. In accordance with aspects of the present specification, the FGD unit 114 is configured to control the operation of the industrial plant 100 by optimizing consumption of slurry and utilization of auxiliary power in the industrial plant 100. In particular, the flue gas 112 is processed by the FGD unit 114 for reducing sulfur oxide contents in the flue gas 112 before releasing the exhaust into the atmosphere.

The FGD unit 114 includes a reactor chamber 116 configured to receive the flue gas 112 from the coal combustion chamber 106. The reactor chamber 116 further includes a plurality of slurry injectors 118 that is operatively coupled to the reactor chamber 116. In one embodiment, the slurry injectors 118 are operatively coupled to the reactor chamber 116 via a plurality of bypass valves. Moreover, in certain embodiments, the slurry injectors 118 are disposed at different levels along the length of the reactor chamber 116. It may be noted that the slurry injectors 118 is configured to supply slurry to the reactor chamber 116.

Further, the FGD unit 114 includes a plurality of slurry pumping motors 150 operatively coupled to the plurality of slurry injectors 118. In one embodiment, the plurality of slurry pumping motors 150 includes at least one variable frequency drive (VFD) motor 140. The slurry pumping motors 150 pump the slurry through a plurality of pipes and the pumped slurry may be sprayed into the reactor chamber 116. In one example, if the FGD unit 114 has a size of about 25,000 square feet, the slurry is lifted to a height of 150 meters and fed/sprayed into the reactor chamber 116 at a rate of about 100 liters per hour.

The reactor chamber 116 is configured to facilitate reaction of the flue gas 112 with the shiny introduced via the plurality of slurry injectors 118. As the slurry flows down the reactor chamber 116, the slurry interacts with the flue gas rising up through the reactor chamber 116 and absorbs sulfur oxides in the flue gas. Any unreacted slurry from the reactor chamber 116 is collected by a slurry chamber 120. The plurality of slurry pumping motors 150 is configured to recirculate the slurry from the slurry chamber 120 to the reactor chamber 116 via the plurality of pipes and the corresponding slurry injectors 118.

The FGD unit 114 is further configured to receive additional slurry from a slurry inlet 148 disposed at a top end of the reactor chamber 116. Further, the FGD unit 114 includes an exhaust 152 through which desulfurized gas 156 is released to the environment. A booster fan 164 may be disposed upstream of the reactor chamber 116 to increase the pressure of the flue gas to aid in directing the flue gas towards the exhaust 152. A stack sensor 122 is disposed near the exhaust 152 and configured to measure a sulfur emission value of the desulfurized gas 156 that is released from the reactor chamber 116. In one embodiment, the stack sensor 122 includes a laser emitter 124 and a laser receiver 126. The laser emitter 124 is configured to generate a laser beam 128. The laser receiver 126 is configured to receive the laser beam 128 transmitted through the desulfurized flue gas emanating from the exhaust 152. The received laser beam is analyzed to determine the measured sulfur emission value from the stack sensor 122. In some embodiments, the industrial plant 100 further includes a coal quality sensor 154 disposed on or about the coal inlet 104 of the industrial plant 100. Moreover, the coal quality sensor 154 is configured to measure a coal quality value of the coal fed to the boiler 102.

The desulfurization of the flue gas generated by the boiler 102 is achieved in the reactor chamber 116 of the FGD unit 114 through a chemical reaction between the flue gas and the slurry using oxygen. The chemical reaction is represented as:

$$2SO_2 + 2CaCO_3 + O_2 = 2CaSO_4 + 2CO_2 \qquad (1)$$

where $SO_2$ is sulfur dioxide, $CaCO_3$ is the chemical formula for slurry (calcium carbonate), and $CaSO_4$ is the chemical formula for fly ash (calcium carbonate, also known as gypsum).

It may be noted that the chemical reaction between the flue gas and the slurry in the reactor chamber 116 happens in two stages. Initially, the sulfur dioxide reacts with the slurry to form calcium sulfite ($CaSO_3$). Further the calcium sulfite is oxidized to form calcium sulfate. In one example, a slurry feed rate of about 1.05 mol is required to remove one mol of sulfur oxide.

As previously noted, the quantity of emission value representative of sulfur oxide is reduced by facilitating a chemical reaction between the slurry (CaCO$_3$) and sulfur dioxide of the flue gas in the presence of oxygen. In one embodiment, the quantity of sulfur oxide in the flue gas is reduced from an initial concentration of about two thousand parts per million (ppm) to about two hundred ppm in accordance with a statutory requirement. It may be noted that the quantity of slurry supplied to the reactor chamber 116 through the plurality of shiny injectors 118 is sufficient to achieve this reduction of in the quantity of sulfur oxide in the flue gas, thereby ensuring that the sulfur oxide is within desirable bounds.

The slurry pumping motors 150 are operated at full load to pump a desired amount of slurry required to process the flue gas having the maximum expected value of sulfur. In this example, a FGD unit tends to consume about 10% of the power generated by the industrial plant as auxiliary power. However, the sulfur content in the flue gas varies and is not at the maximum expected value at all time instants during the operation of the FGD unit 114. When the flue gas includes lower values of sulfur content, a lower quantity of slurry is required to be supplied to the FGD unit 114 to meet the statutory requirement.

In accordance with aspects of the present specification, the amount of slurry pumped into the reactor chamber 116 is altered based on the sulfur content in the flue gas in the reactor chamber 116. In particular, when the sulfur content in the flue gas in the reactor chamber 116 is less than the maximum expected value, a proportionately lower quantity of slurry is supplied to the reactor chamber 116 to reduce the sulfur content to the desirable bounds. Accordingly, the plurality of slurry pumping motors 150 need not be operated at full load. At least one or more of the plurality of slurry pumping motors 150 may be operated at partial loads to supply the reduced quantity of slurry.

Consequently, the use of slurry in the FGD unit 114 is reduced and thereby results in a reduction in use of auxiliary power. Accordingly, one or more of the plurality of slurry pumping motors 150 are operated at partial loads to supply the proportionately reduced quantity of slurry to the reactor chamber 116. In one embodiment, the at least one VFD motor 140 may be operated at a partial load, while the other slurry pumping motors 150 are operated at full load. It may be noted that in certain embodiments, the operation of the at least one VFD motor 140 is determined based on the measured sulfur emission value. More specifically, in one embodiment, a determined quantity of slurry required for desulfurization may be determined based on the measured sulfur emission value. In some embodiments, the determined quantity of slurry may be obtained from a look-up table.

Moreover, the partial load at which the VFD motor 140 is to be operated to supply the determined quantity of slurry may be computed based on VFD motor ratings. The VFD motor 140 may be controlled by a motor controller (such as within a controller 136) to operate at the determined partial load. In one embodiment, controlling the VFD motor 140 via the motor controller may entail reducing at least one of an operating motor current and an operating motor voltage. Operating the VFD motor 140 at partial loads enable savings in motor power requirements. The slurry consumption is also optimized in the desulfurization reaction and results in a reduction of quantity of slurry used in the reactor chamber 116.

In some embodiments, the power consumption of the FGD unit may be further reduced by optimizing operation of the booster fan 164. It may be noted that the booster fan 164 used to increase the flue gas pressure consumes a significant amount of electric power. However, the booster fan 164 may be operated at lower speeds when the pressure of the flue gas is sufficiently high. In such a situation, the booster fan 164 may be operated at reduced loads enabling savings in booster fan power requirements. In one embodiment, about 25% of the auxiliary power may be saved by optimizing the operation of the FGD unit 114.

The FGD unit 114 of FIG. 1 further includes a controller unit 130 configured to optimize the desulfurization of the flue gas produced by the industrial plant 100. In one embodiment, the controller unit 130 includes a signal acquisition subunit 134, a controller 136, and a memory subunit 138 that are communicatively coupled to each other by a communications bus 142.

In certain embodiments, the controller unit 130 may be operatively coupled to one or more of the stack sensor 122, the plurality of bypass valves 158, and the VFD motor 140. The controller unit 130 is configured to receive a plurality of baseline parameters 132 corresponding to the FGD unit 114 of the industrial plant 100. Moreover, the controller unit 130 is configured to control operation of one or more of the bypass valves 158 and the VFD motor 140 based on the baseline parameters 132. Specifically, the controller unit 130 is configured to generate a valve control signal 144 and communicate the valve control signal 144 to the bypass valves 158 to control the operation of the bypass valves 158 of the plurality of slurry injectors 118. Further, the controller unit 130 is configured to generate and communicate a motor control signal 146 to the VFD motor 140 to control the operation of the VFD motor 140. In one embodiment, the bypass valves are not present and the controller unit 130 is configured to solely control the operation of the VFD motor 140.

The signal acquisition subunit 134 is communicatively coupled to the stack sensor 122 and configured to receive the plurality of baseline parameters 132 from the stack sensor 122 and any other sensors (not shown) of the FGD unit 114. The baseline parameters 132 may include one or more design parameters of the FGD unit 114 and one or more operating parameters of the industrial plant 100. By way of a non-limiting example, the baseline parameters 132 include, but are not limited to, an injector count, an active injector count, and a load range of the VFD motor 140, or combinations thereof. The term 'injector count' refers to the number of injector levels available in the FGD unit 114 and the term 'active injector count' refers to the number of injector levels that are in use at any given instant of time. The term 'load range' refers to a range parameter corresponding to the VFD motor 140 and is bound by the rated load of the VFD motor 140. It is desirable to maintain the load value of the VFD motor 140 at any instant within the load range. In another example, the term 'load value' may refer to percentage values with reference to a known rated load. The load value of the VFD motor 140 may be altered by the controller 136 by varying at least one of the operating motor current value and the operating motor voltage value. At least one of the amount of slurry pumped or the rate of pumping of slurry into the FGD unit 114 may be changed with the variations of operating motor current value and the operating voltage value.

In one embodiment, the plurality of baseline parameters 132 includes an emission value of sulfur oxides in the flue gas 112. The emission value of sulfur oxides in the flue gas 112 is measured by the stack sensor 122. One non-limiting example of a stack sensor 122 includes a laser sensor. Also, in one example, the emission value of the sulfur oxides may be represented as a ratio of parts per million of the flue gas 112. The sulfur oxides may include sulfur dioxide ($SO_2$) and/or sulfur trioxide ($SO_3$). The term sulfur oxide is also used to refer to acids of sulfur oxides, such as, but not limited to, sulfurous acid ($H_2SO_3$), sulfuric acid ($H_2SO_4$), sulfites, and sulfates. Further, the plurality of baseline parameters 132 may also include a coal quality measured by the coal quality sensor 154. Moreover, the plurality of baseline parameters 132 may include a pH value of the slurry introduced into the reactor chamber 116.

The controller 136 is communicatively coupled to the signal acquisition subunit 134 and configured to estimate a desirable value of the slurry parameter for the desulfurization of the flue gas 112 based on the measured emission value of the sulfur oxides. The term 'slurry parameter' is used to refer to parameters related to the slurry such as, but not limited to, a slurry quantity value and a slurry rate value. In one embodiment, the desirable value of slurry parameter is a desirable quantity of slurry to be introduced into the FGD unit 114 at a present instant to control the sulfur emissions within the statutory/regulatory bounds. In another embodiment, the desirable value of slurry parameter is a desirable rate at which the slurry is to be introduced to the FGD unit 114 at a present instant to control the sulfur emissions within the statutory/regulatory bounds. In one embodiment, the desirable value of the slurry parameter is determined based on knowledge of chemical reactions involving sulfur oxides and the slurry. Specifically, in one embodiment, the desirable value of the slurry parameter is determined by the controller 136 by estimating a desirable reduction in the emission of sulfur oxides based on the measured emission value and the statutory bounds.

In one embodiment, the controller 136 may use one or more analytical models representative of the FGD unit 114, chemical reactions, and/or other operational aspects of the FGD unit 114 to determine the desirable slurry parameter. It may be noted that the analytical models may include a plurality of models such as, but not limited to, process models representative of chemical reactions in an absorption section and an oxidation section of the reactor chamber 116. Further, models for motion of slurry, absorption of sulfur oxides, and dissolution of limestone are also used in the process models. Each analytical model may be determined based on corresponding theoretical foundations. In one example, the model corresponding to the oxidation section is based on a population balance theory, while the model corresponding to the absorption section is based on an unsteady theory. The lime stone dissolution model is based on a stagnant-film theory. In other embodiments, specific models for oxidation and crystallization of gypsum may also be used. In one embodiment, the analytical model may also include a coal quality parameter. In such an embodiment, the coal quality value is measured using the coal quality sensor 154. Further, the analytical models are employed for estimating the desirable value of the slurry parameter. In some embodiments, the analytical models may use the pH value of the slurry to estimate the desirable value of the slurry parameter. The one or more analytical models may be a steady state model, a dynamic model, a support vector machine, a neural network model, a linear regression model, an empirical model, a heuristic based model, or combinations thereof.

The controller 136 is further configured to determine at least one desulfurization parameter based on the desirable value of slurry parameter. In one embodiment, the desulfurization parameter includes at least one of a desirable load value of the VFD motor 140, a desirable injection count of the number of slurry injectors 118, or a combination thereof. In one embodiment, at least one desulfurization parameter may be retrieved from a look-up table using the desirable value of slurry parameter. In another embodiment, the controller 136 is further configured to modify the active injector count based on the desirable load value.

Further, the controller 136 is also configured to control the operation of the FGD unit 114 based on at least one desulfurization parameter by modifying at least one of the consumption of the slurry and the auxiliary power in the industrial plant 100. In one embodiment, the controller 136 is configured to generate the valve control signal 144 for operating one or more bypass valves 158 to vary the amount of slurry introduced into the FGD unit 114. In another embodiment, the controller 136 is configured to generate the motor control signal 146 to control the operation of the VFD motor 140 for varying the amount of slurry introduced into the FGD unit 114 and reduce the consumption of slurry used by the FGD unit 114 when less slurry is needed to meet the statutory emissions requirements. Additionally, the controller 136 may be configured to reduce the auxiliary power used by the FGD unit 114 during such circumstances. In certain embodiments, the controller 136 is configured to reduce the consumption of at least one of the slurry and the auxiliary power in the industrial plant 100 by optimizing the use of slurry and the auxiliary power in the FGD unit 114. In some embodiments, the controller 136 is configured to reduce the consumption of power by operating the booster fan 164 at reduced speeds.

Moreover, the controller 136 may include at least one of a general purpose processor, a digital signal processor or a customized processing element such as, but not limited to, an application specific integrated circuit (ASIC) and field programmable gate array (FPGA). The controller 136 may receive additional inputs from a user through a user interface 162 or any other input device such as a keyboard. The controller 136 may also be configured to provide one or more outputs to an output device such as a display 160 or actuators disposed in the FGD unit 114 and/or other parts of the industrial plant 100. In one embodiment, the controller 136 generates and provides output signals to actuate the bypass valves 158 of the slurry injectors 118. In another embodiment, the controller 136 generates and provides output signals for controlling the motor load of VFD motor 140. The controller 136 may also be configured to perform the functionality provided by the signal acquisition subunit 134, in some embodiments. The controller 136 is also configured to store data into and retrieve data from the memory subunit 138.

In one embodiment, the memory subunit 138 is a random-access memory (RAM), read only memory (ROM), flash memory or any other type of computer readable memory medium accessible by at least one of the signal acquisition subunit 134 and the controller 136. Also, in certain embodiments, the computer readable memory medium may be encoded with a program to instruct the controller 136 to enable a sequence of steps to perform the optimized flue gas desulfurization in the industrial plant 100.

Figure 2:
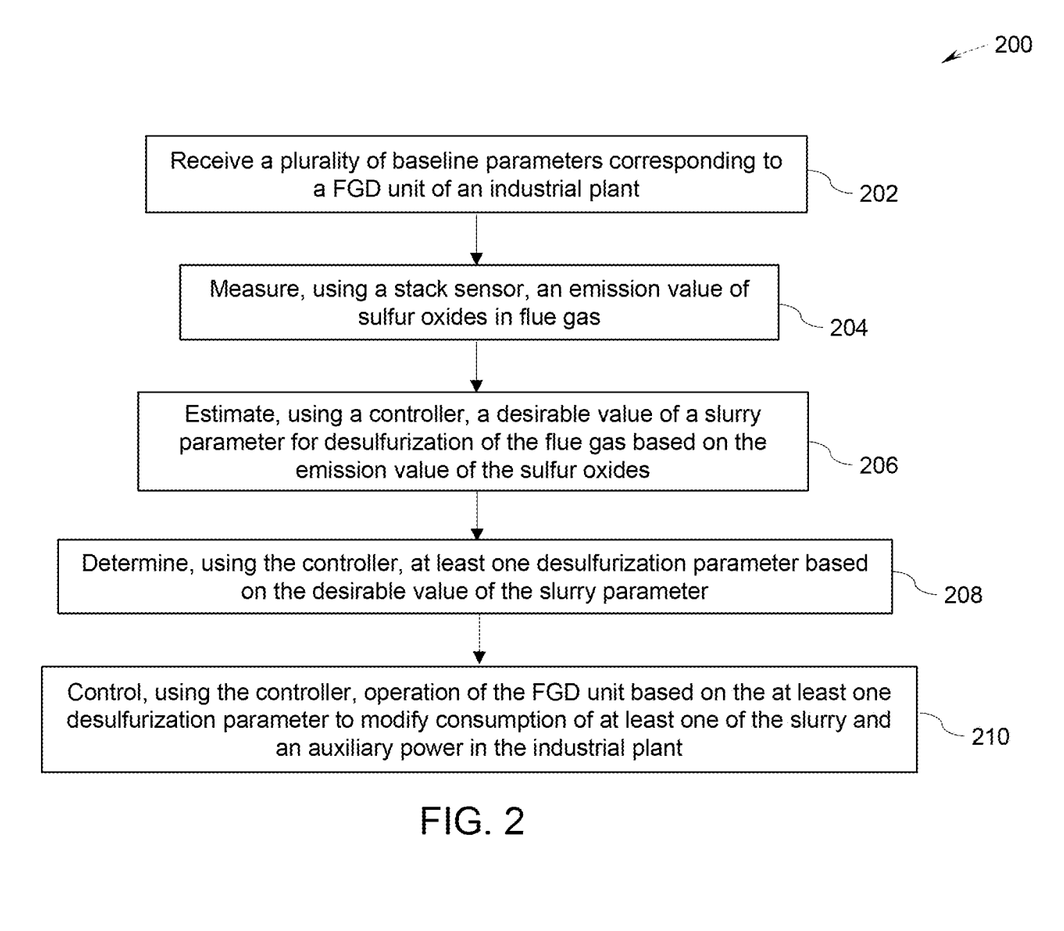
FIG. 2 is a flow chart of a method of controlling operation of a flue gas desulfurization unit, in accordance with aspects of the present specification.

FIG. 2 is a flow chart of a method 200 of controlling operation of a flue gas desulfurization unit in an industrial plant, in accordance with aspects of the present specification. The method 200 will be described with reference to the components of FIG. 1. In some embodiments, steps 206-210 may be performed by the controller unit 130.

The method 200 includes receiving a plurality of baseline parameters 132 corresponding to the FGD unit 114 of the industrial plant 100, as indicated by step 202. In one embodiment, the plurality of baseline parameters 132 includes an injector count representative of an available number of slurry injectors. As previously noted, the plurality of baseline parameters 132 also includes one or more of the active injector count and the load range of VFD motor 140.

Moreover, at step 204, the method 200 includes measuring, using the stack sensor 122, an emission value of sulfur oxides in the flue gas 112. In one embodiment, an infrared laser based sensor is used to measure the emission value. In some embodiments, in addition to the emission value, a coal quality value measured using the coal quality sensor 154 may also be received at step 204. Additionally, a pH value of the slurry may also be measured at step 204 in certain embodiments.

The method 200 also includes estimating a desirable value of a slurry parameter for desulfurization of the flue gas 112 in the reactor chamber 116 based on the measured emission value of sulfur oxides, as indicated by step 206. In another embodiment, the desirable value of the slurry parameter may be determined using at least one of the coal quality value and the pH value of the slurry. In yet another embodiment, the desirable value of slurry parameter may include at least one of a slurry-quantity value and a slurry rate value. The slurry quantity value is representative of a desirable amount of slurry to be supplied to the reactor chamber 116 to reduce the emission value to be within the statutory bounds. Similarly, the slurry rate value is representative of a desirable rate of supply of the slurry to the reactor chamber 116 to reduce the emission value to be within the statutory bounds. In one embodiment, the slurry quantity value or a plurality of slurry rate values corresponding to the plurality of slurry injectors is determined based on an analytical model corresponding to the FGD unit 114.

Subsequently, as indicated by step 208, the method 200 further includes determining, using the controller 136, at least one desulfurization parameter based on the estimated desirable value of slurry parameter. In one embodiment, the desulfurization parameter includes at least one of a desirable load value of the VFD motor 140, a desirable injection count of the number of slurry injectors 118, or a combination thereof. In one embodiment, the desulfurization parameter may be retrieved from a look-up table using the desirable value of slurry parameter. The look-up table may include entries having the desirable load value and the desirable injection count. In another embodiment, the determination of at least one desulfurization parameter includes modifying the active injector count based on the desirable load value.

In addition, at step 210, operation of the FGD unit 114 is controlled based on the at least one desulfurization parameter. The controller 136 is used to perform step 210, in one embodiment. More particularly, the controller 136 is configured to control the operation of the FGD unit 114 to optimize the consumption of the quantity of slurry used by the FGD unit 114. Additionally, or alternatively, the operation of the FGD unit 114 is controlled to facilitate reduction in the consumption of auxiliary power in the industrial plant 100. In one embodiment, the controlling of step 210 entails operating the bypass valve 158 to modify the amount of slurry introduced into the FGD unit 114. In another embodiment, the controlling of step 210 calls for operating the VFD motor 140 to modify the amount of slurry introduced into the FGD unit 114. In yet another embodiment, the controlling of step 210 includes reducing consumption of at least one of the slurry and the auxiliary power in the industrial plant 100. The controlling of step 210 may also include reducing the consumption of power by operating the booster fan 164 at a reduced speed.

Figure 3:
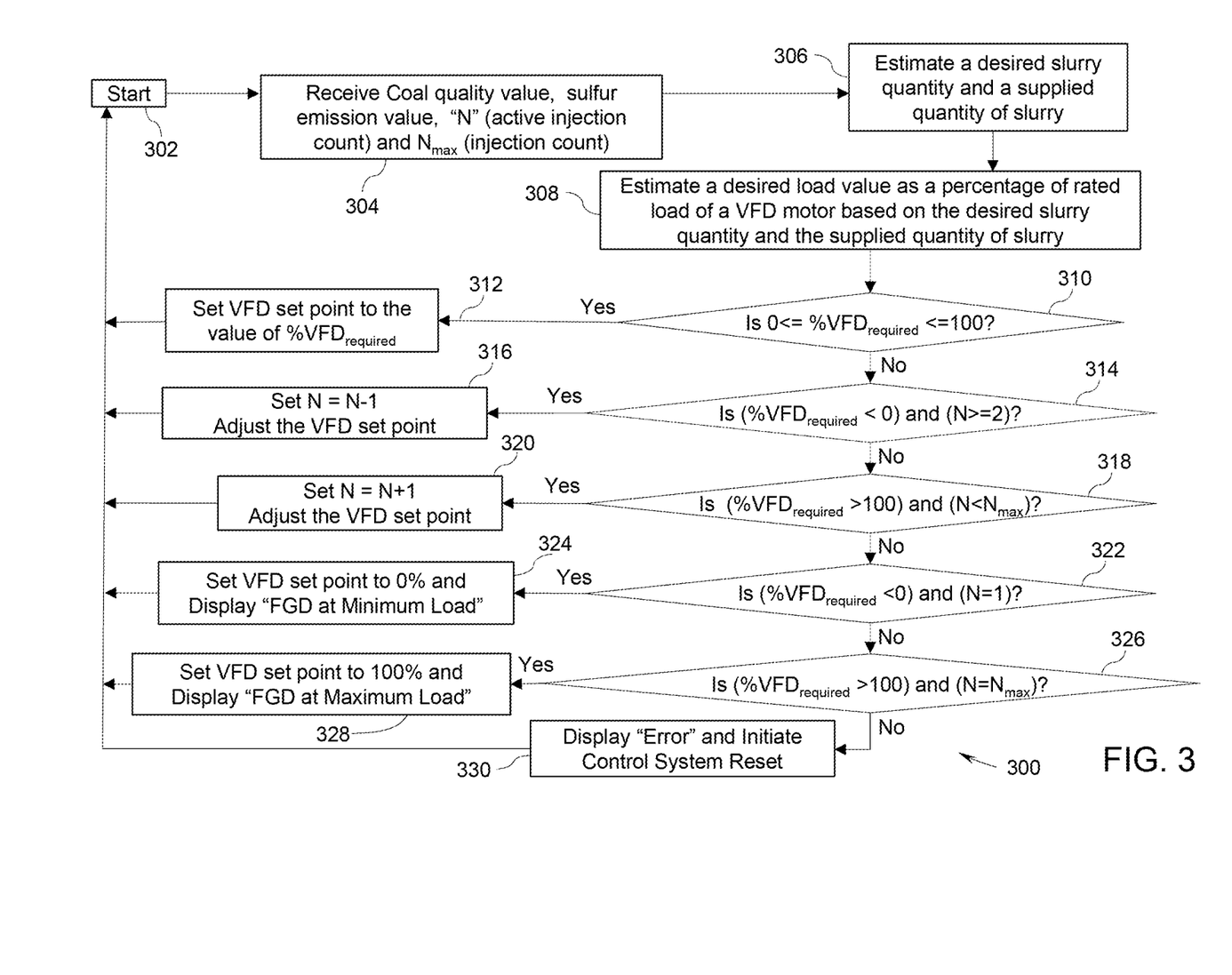
FIG. 3 is a flow chart illustrating a control scheme for desulfurization of the flue gas using the system of FIG. 1, in accordance with aspects of the present specification.

FIG. 3 is a flow chart illustrating a control scheme 300 for desulfurizing flue gas in the industrial plant 100 of FIG. 1, in accordance with aspects of the present specification. The flow chart 300 is representative of a sequence of processing and control steps initiated at regular intervals and iteratively performed during the operation of the industrial plant 100. The method 300 is described with reference to the components of FIGS. 1-2.

At step 302 of each iteration, a plurality of baseline parameters is received, as previously described with reference to step 202 of FIG. 2. Moreover, at step 304, a coal quality value and a sulfur emission value are received. The coal quality value and the sulfur emission value are measured by the coal quality sensor and the stack sensors respectively. Further, a plurality of operating parameters such as, but not limited to, the active injection count (number of injector levels in operation) and the injection count (total number of injector levels) are received. The active injection count is represented herein by a symbol N and the injection count is represented by a symbol $N_{max}$. In one embodiment, an operating set point for the VFD motor is also received at step 304.

Further, at step 306, a desirable quantity of slurry required to reduce the sulfur emission to be within statutory bounds is estimated based on the sulfur emission value received at step 304. Also, a supplied quantity of slurry is estimated based on the active injection count N. In one embodiment, the baseline parameters, the sensor parameters, and the operating parameters are used to determine the desirable quantity of slurry. In particular, an analytical model representative of the FGD unit 114 is configured to utilize one or more of the baseline parameters, the sensor parameters, and the operating parameters to determine the desirable quantity of slurry. In certain embodiments, the analytical model is based on equation (1) and accounts for the factors governing the rate of chemical reaction such as, but not limited to, temperature of the reactor chamber 116, pressure of the reactor chamber 116, and relative volumes of the reactants. Moreover, in some embodiments, the analytical model is also configured to consider others operating parameters for determining the desirable quantity of slurry. In addition, at step 306, a desirable rate of pumping of slurry is determined based on the injection count $N_{max}$ in the FGD unit 114.

Subsequently, at step 308, a desulfurization parameter such as a desirable load value of the VFD motor 140 is estimated. The desirable load value may be represented as a percentage of a known rated load of the VFD motor 140. In one embodiment, the desirable load value is determined based on the desirable quantity of shiny, the supplied quantity of slurry, and the active injection count N. It may be noted that the desirable load value may be more than 100% of the rated load of the VFD motor 140. In a similar manner, the desirable load value may be a negative value if the desirable quantity of slurry is less than the supplied quantity of slurry.

In one embodiment, the desirable load value and the active injection count N are compared with a plurality of preset threshold values to determine a new set point for the VFD motor 140 and a corresponding active injection count. Steps 310-328 depict a process for determining the new set point for the VFD motor 140 and the associated active injection count corresponding to the desirable load value of the VFD motor 140 estimated at step 308.

At step 310, the desirable load value is compared with a lower limit (for example, a zero percent load value) and an upper limit (for example, a hundred percent load value) to determine if a change in the active injection count Nis desired. At step 310, if the desired load value is greater than the lower limit and lower than the upper limit, a new set point for the VFD motor 140 is set to the desirable load value determined at step 308, as depicted by step 312.

However, at step 310, if it is determined that the desirable load value determined at step 308 does not lie within the lower limit and upper limit, a second comparison is performed at step 314. More particularly, the second comparison of step 314 entails verifying if the desirable load value is lower than lower limit and if the active injection count is greater than one. In particular, at step 314, if it is determined that the desirable load value is lower than lower limit and the active injection count is greater than one, the active injection count is decremented by one and a new set point for the VFD motor 140 is adjusted by varying the operating voltage and the operating current values to match the desirable load value, as indicated by step 316.

However, at step 314, if it is determined that the desirable load value is not lower than lower limit and the active injection count is not greater than one, a third comparison is performed at step 318. The third comparison verifies if the desirable load is greater than the upper limit and the active injection count is smaller than the maximum injection count. Specifically, at step 318, if it is determined that the desirable load value is greater than the upper limit value (for example, a hundred percent load value), and the active injection count is smaller than the maximum injection count, the active injection count is incremented by one. Further, a new set point for the VFD motor 140 is set to the desirable load value determined at step 308, as depicted by step 320.

However, at step 318, if it is determined that the desirable load value determined at step 308 is not above the upper limit or if the number of active injection count is not less than the maximum injection count, a fourth comparison is performed at step 322. If the desirable load value determined at step 308 is below the lower limit and if the number of active injection count is equal to one, a new set point for the VFD motor 140 is set to a value of zero at step 324. Further, a display message 'FGD at Minimum Load' is generated and displayed on the display 160, as indicated by step 324. If the comparison at step 322 determines that the FGD unit 114 is not operating at a low load condition, a fifth comparison is performed at step 326. The comparison at step 326 entails verifying if the desired load condition is above the upper limit and the active injection count is equal to the injection count of the FGD unit 114.

If the comparison at step 326 determines that the desired load value is greater than the upper limit (a hundred percent value in the illustrated example) and the active injection count is equal to the maximum injection count, a new set point for the VFD motor 140 is set to a value equal to an upper limit value, as indicated by step 328. Further, a display message 'FGD at Maximum Load' is generated and displayed on the display unit 160, as depicted by step 328. If the comparison at step 326 determines that the FGD unit 114 is not operating at the maximum load condition, an 'error' message is generated and displayed on the display 160, as indicated by step 330.

It may be noted that subsequent to any one of steps 312, 316, 320, 324, 328, 330, the control scheme 300 is reset to a start position of step 302. In certain embodiments, the control scheme 300 may be continued after a determined delay period that is set by the user of the industrial plant 100.

The system and method for flue gas desulfurization presented hereinabove provide a framework for optimized operation of the FGD unit 114 in an industrial plant. Use of the system and method advantageously aids in reducing the auxiliary power requirement of the industrial plant and the quantity of slurry needed to reduce sulfur emissions to a value within the statutory bounds. By way of example, for an FGD unit 114 having four slurry pumping motors, up to 25% savings in the auxiliary power and about 33% savings in slurry consumption were achieved.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method for desulfurization of a flue gas in a desulfurization unit of an industrial plant, the method comprising:
   receiving a plurality of baseline parameters corresponding to the desulfurization unit of the industrial plant;
   measuring, using a stack sensor, an emission value of sulfur oxides in the flue gas;
   estimating, using a controller, a target value of a slurry parameter for desulfurization of the flue gas based on the measured emission value of the sulfur oxides;
   determining, using the controller, at least one desulfurization parameter based on the target value of the slurry parameter; and
   controlling, using the controller, operation of the desulfurization unit based on the at least one desulfurization parameter to modify consumption of at least one of a slurry and an auxiliary power in the industrial plant, wherein the controlling includes:
   modifying a load value of a variable frequency drive (VFD) motor for driving a plurality of slurry pumping motors in the desulfurization unit in response to the target value of the slurry parameter being achievable via the VFD motor, and
   modifying a number of active slurry injectors in the desulfurization unit in response to the target value of the slurry parameter not being achievable via the VFD motor.

2. The method of claim 1, wherein the plurality of baseline parameters includes an injector count representative of an available number of slurry injectors, an active injector count representative of a number of slurry injectors in operation among the available number of slurry injectors, a load range of a variable frequency drive motor operatively coupled to the desulfurization unit, or combinations thereof.

3. The method of claim 2, wherein the at least one desulfurization parameter includes a target load value of the variable frequency drive motor, a target injector count of the number of slurry injectors, or a combination thereof.

4. The method of claim 3, wherein determining the at least one desulfurization parameter includes retrieving the target load value and the target injector count from a look-up table.

5. The method of claim 3, wherein determining the at least one desulfurization parameter further includes modifying the active injector count based on the target load value.

6. The method of claim 1, further comprising:
measuring, using a coal quality sensor, a coal quality value of coal in the industrial plant; and
estimating, using the controller, the slurry parameter based further on the coal quality value.

7. The method of claim 1, wherein estimating the target value of the slurry parameter includes determining at least one of a slurry quantity value and a slurry rate value based on an analytical model corresponding to the desulfurization unit.

8. The method of claim 1, wherein controlling the operation of the desulfurization unit includes operating a bypass valve to modify an amount of slurry introduced into the desulfurization unit.

9. The method of claim 1, wherein controlling the operation of the desulfurization unit includes operating a variable frequency drive motor to modify an amount of slurry introduced into the desulfurization unit.

10. A desulfurization unit in an industrial plant, comprising:
a reactor chamber;
a plurality of slurry injectors coupled to the reactor chamber;
a plurality of slurry pumping motors operatively coupled to the plurality of slurry injectors, wherein the plurality of slurry pumping motors includes at least one variable frequency drive motor;
a stack sensor disposed in the reactor chamber and configured to measure an emission value of a flue gas, wherein the emission value is representative of sulfur oxides in the flue gas;
a controller unit communicatively coupled to the stack sensor and the at least one variable frequency drive motor, wherein the controller unit includes:
a signal acquisition subunit communicatively coupled to the stack sensor and configured to receive a plurality of baseline parameters corresponding to the desulfurization unit of the industrial plant;
a controller communicatively coupled to the signal acquisition subunit and configured to:
estimate a target value of a slurry parameter for desulfurization of the flue gas based on the measured emission value;
determine at least one desulfurization parameter based on the target value of the slurry parameter; and
control operation of the desulfurization unit based on the at least one desulfurization parameter to modify consumption of at least one of the slurry parameter and auxiliary power in the industrial plant by actions including:
modifying a load value of a variable frequency drive (VFD) motor for driving a plurality of slurry pumping motors in the desulfurization unit in response to the target value of the slurry parameter being achievable via the VFD motor, and
modifying a number of active slurry injectors in the desulfurization unit in response to the target value of the slurry parameter not being achievable via the VFD motor.

11. The desulfurizing unit of claim 10, wherein the plurality of baseline parameters includes an injector count representative of an available number of slurry injectors, an active injector count representative of a number of slurry injectors in operation among the available number of slurry injectors and a load range of the at least one variable frequency drive motor operatively coupled to the desulfurization unit, or combinations thereof.

12. The desulfurizing unit of claim 11, wherein the at least one desulfurization parameter includes a target load value of the at least one variable frequency drive motor, a target injector count of the number of slurry injectors, or a combination thereof.

13. The desulfurizing unit of claim 12, wherein the controller is configured to retrieve the target load value and the target injector count from a look-up table.

14. The desulfurizing unit of claim 12, wherein the controller is configured to modify the active injector count based on the target load value.

15. The desulfurizing unit of claim 10, wherein the controller is further configured to:
receive a coal quality value corresponding to coal used in the industrial plant; and
estimate the slurry parameter based further on the coal quality value.

16. The desulfurizing unit of claim 10, wherein the controller is further configured to determine at least one of a slurry quantity value and a slurry rate value based on an analytical model corresponding to the desulfurization unit.

17. The desulfurization unit of claim 10, wherein the controller is further configured to operate a bypass valve to modify an amount of slurry introduced into the desulfurization unit.

18. The desulfurization unit of claim 10, wherein the controller is further configured to operate the at least one variable frequency drive motor to modify the slurry parameter.

19. An industrial plant, comprising:
a boiler comprising a combustion chamber and configured to:
receive coal from a coal inlet and condensed steam from a steam condensation unit;
facilitate combustion of the coal to generate steam for power generation, wherein the combustion of the coal also generates flue gas having sulfur oxides;
a desulfurization unit including:
a reactor chamber configured to receive the flue gas from the combustion chamber;
a plurality of slurry injectors coupled to the reactor chamber via a plurality of bypass valves, wherein the plurality of slurry injectors is disposed at different levels along a length of the reactor chamber;
a plurality of slurry pumping motors operatively coupled to the plurality of slurry injectors, wherein the plurality of slurry pumping motors includes at least one variable frequency drive motor;
a stack sensor disposed in the reactor chamber and configured to measure an emission value of the flue gas, wherein the emission value is representative of sulfur oxides in the flue gas;
a controller unit communicatively coupled to one or more of the stack sensor, the plurality of bypass valves, and the plurality of the slurry pumping motors, wherein the controller unit includes:
a signal acquisition subunit communicatively coupled to the stack sensor and configured to receive a plurality of baseline corresponding to the desulfurization unit of the industrial plant;

a controller communicatively coupled to the data acquisition subunit and configured to:

estimate a target value of a slurry parameter for desulfurization of the flue gas based on the measured emission value;

determine at least one desulfurization parameter based on the target value of the slurry parameter; and control operation of the desulfurization unit based on the at least one desulfurization parameter to modify consumption of at least one of the slurry parameter and auxiliary power in the industrial plant by performing actions including:

modifying a load value of a variable frequency drive (VFD) motor for driving the plurality of slurry pumping motors in the desulfurization unit in response to the target value of the slurry parameter being achievable via the VFD motor, and modifying a number of active slurry injectors in the desulfurization unit in response to the target value of the slurry parameter not being achievable via the VFD motor.

* * * * *